United States Patent [19]
Kuhlmann et al.

[11] 4,112,813
[45] Sep. 12, 1978

[54] EXPANSION ANCHOR ASSEMBLY INCLUDING A YIELDING MEMBER

[75] Inventors: Wolf Kuhlmann, Munich; Gerhard Rumpp, Inning, both of Germany

[73] Assignee: Hilti Aktiengesellschaft, Schaan, Liechtenstein

[21] Appl. No.: 714,333

[22] Filed: Aug. 13, 1976

[30] Foreign Application Priority Data

Aug. 13, 1975 [DE] Fed. Rep. of Germany ....... 2536137

[51] Int. Cl.² .................. F16B 13/06; F16B 31/02
[52] U.S. Cl. ............................................ 85/74; 85/62
[58] Field of Search .............. 85/74, 75, 76, 67, 72, 85/62, 61

[56] References Cited

U.S. PATENT DOCUMENTS

| | | | |
|---|---|---|---|
| 2,188,356 | 1/1940 | Jeans et al. | 85/62 |
| 2,824,481 | 2/1958 | Johnson | 85/62 |
| 3,937,123 | 2/1976 | Matuschek et al. | 85/72 |

FOREIGN PATENT DOCUMENTS

633,784  2/1962  Italy .............................................. 85/74

*Primary Examiner*—Ramon S. Britts
*Attorney, Agent, or Firm*—Toren, McGeady and Stanger

[57] ABSTRACT

In a straddling dowel or expansion anchor assembly a spreader is threaded on one end of a bolt so that by turning the bolt the spreader is pulled into an expansion sleeve for spreading it into anchoring contact with the surface of a borehole. The opposite end of the bolt has a shoulder provided by a head or nut. Between the expansion sleeve and the shoulder, a yielding member laterally encloses the bolt and yields at least when a minimum anchoring value of the expansion sleeve has been reached. The yielding member affords a visible indication that the minimum anchoring value has been achieved. A washer is positioned adjacent the shoulder on one end of the bolt. Before the expanding action, the washer is spaced from the shoulder on the bolt by the yielding member or by a separate member, however, as the minimum anchoring value is achieved the washer is displaced relative to the member which spaces it from the shoulder, into contact with the shoulder.

7 Claims, 4 Drawing Figures

EXPANSION ANCHOR ASSEMBLY INCLUDING A YIELDING MEMBER

SUMMARY OF THE INVENTION

The present invention is directed to a straddling dowel or expansion anchor assembly where, by rotating a threaded bolt at the end to which a load is attached, a spreader in threaded engagement with the bolt is pulled into an expanding sleeve causing it to widen into anchoring engagement and a stop member, such as a washer, is fitted on the bolt to limit its depth of insertion into the borehole. More particularly, the invention concerns a yielding member mounted on the bolt for providing a visual indication that a minimum anchoring value has been achieved by the assembly.

Expansion anchors of the type described above generally serve to fasten a member to a support structure. In carrying out the fastening operation, the anchor or dowel is introduced into a borehole or similar opening in the support structure. The anchor is usually an elongated bolt with a load-fastening shoulder, such as provided by the bolthead, on one end of the bolt for forcing a washer into tightly fitting engagement with the member to be secured to the support structure. By rotating the head of the bolt, the spreader is pulled into an expansion sleeve with the sleeve widened radially into contact with the borehole while the load-fastening shoulder moves toward the member to be secured so that it can be tightly attached to the support structure.

The widening of the expansion sleeve and the anchoring values obtained depend on the number of revolutions made by the fastening bolt. Since only the shoulder formed by the bolthead is visible from the outside as the expansion anchor is set in place, the operator whose job it is to set the anchor has no indication which would permit the conclusion that the requisite anchoring values have been achieved. As a result, it is uncertain whether the expansion sleeve has expanded surfficiently to afford the requisite anchoring values or whether the sleeve has been spread too far.

It has been known to position a dish-shaped deformable washer between the load fastening shoulder on the bolt and the part to be fastened. However, the degree of deformation of this washer can not provide the operator with any indication regarding the anchoring values obtained. The lack of such indication stems mainly from the fact that the degree of deformation of the washer is composed, on the one hand, of the force required to spread the expanding sleeve in the borehole and, on the other hand, of the force for clamping the member to the support structure. Furthermore, a force of indeterminable size acts during the anchoring operation between the central region of the washer and the spreader. These different forces which are not exactly determinable in size, the action of the forces with different lever arms on the washer, and the poorly definable friction forces on the outer edge of the washer lead to a relatively uncertain and widely varying force on the spreader of the expansion anchor using a flat washer. Accordingly, it is not possible to determine the extent of the forces applied on the expansion sleeve by studying the extent to which the washer has been flattened. Therefore, the extent of the force applied in spreading the expansion sleeve is unknown and, furthermore, the deformation of the dish-shaped washer depends to a great degree on the type of surface of the member against which it bears. Further, uncertainty concerning the anchoring values stems from the required subjective evaluation of the operator as to the extent to which the washer has been flattened.

Therefore, a primary object of the present invention is to solve the problem of providing an expansion anchor assembly which includes a device indicating the anchoring values actually attained.

In one embodiment of the invention, the problem is solved in an expansion anchor of the above-described type by incorporating a yielding part positioned between the load-fastening shoulder on the bolt or similar member of the anchoring assembly and the expansion sleeve so that the yielding part is exposed to axial forces generated during the expansion of the anchor which effects a reduction in the spacing between the load-fastening shoulder and the expansion sleeve. The deformation resistance of the yielding part is such that the expansion anchor has achieved a minimum anchoring value in the support structure at least at the completion of the deformation of the yielding part. Further, before the assembly is secured within a borehole a washer is provided which is spaced from the load-fastening shoulder on the bolt and is held in that position by the yielding member or a yielding spacer and the washer is displaced into contact with the shoulder during the attainment of the minimum anchoring value.

When the yielding member is supported between the load-fastening shoulder on the bolt and the expanding sleeve, the axial forces generated as the dowel or anchor is set, extends from the expanding sleeve over the yielding member, if necessary with the interposition of a distance sleeve, to the load-fastening shoulder of the bolt. The anchor can then be expanded as a self-contained element, that is, without bearing on an outer stop means. In another embodiment, the yielding member can be supported between the load-fastening shoulder on the bolt and a stop member such as a washer. In this arrangement a deformable part bears on the load-fastening shoulder and on the part to be secured to the support structure or on the support structure itself.

In still another arrangement, the deformable part can bear against the rear spreader in an anchor having two spreaders which is the equivalent of bearing on the expanding sleeve.

The deformable yielding part is positioned so that it is constantly deformed during the expanding action, that is, as increasingly greater forces are transmitted from the bolt to the spreader and then to the expansion sleeve. The deformation of the yielding member or part should be completed when the anchor has achieved the anchoring value desirable for a particular case, that is, when the friction between the expansion sleeve and the surface of the borehole in the support structure is such that the expansion sleeve is locked under the load of the anchor or dowel and, at most, further spreading can develop by a slight displacement of the spreader. These anchoring values are called in the present case minimum anchoring values. The complete deformation of the yielding member or part thus serves as an optical or visual control that the anchor has reached its minimum anchoring values whereby the forces providing the expanding action do not become excessive to a point that failure occurs in the support structure or in the expansion anchor.

In a preferred embodiment of the invention, the stop member which bears against the part to be fastened and forces it against the support structure, is designed as a washer and the yielding member acts as a spacer maintaining the washer in spaced relation to the load-fastening shoulder on the bolt. With the yielding member acting both as the spacer and as the yielding part, it is provided between the load-fastening shoulder on the bolt and the washer, and the radially outer surface of the sleeve providing the spacing action between the shoulder and the washer has a deformable zone with a diameter greater than the inside diameter of the washer. That portion of the yielding member which acts as a spacer thus traverses the washer as the anchor is expanded and can also be connected with the expansion sleeve or with a rear spreader. Such an arrangement facilitates the guidance of the yielding member relative to the expansion sleeve. The connection with the expansion sleeve can be provided by a partial penetration of the yielding member into the end of the expansion sleeve. In such a yielding member which acts also as a spacer, the deformation is provided in that portion of the member located between the washer and the head of the bolt.

To afford a uniform distribution of the deforming action over the circumference of the yielding member, its deformable zone can widen, preferably conically, toward the head of the bolt. In other words, the deformable zone of the yielding member which also acts as a spacer sleeve increases in a conical or frusto-conical manner from the washer toward the head of the bolt. With this frusto-conical arrangement of the deformable zone of the yielding member, a progressively increasing deforming force is achieved as the sleeve-like yielding member penetrates through the washer.

Another possibility for the deformable zone of the sleeve-like yielding member is to provide one or a number of corrugations in its outer surface. These corrugations can extend in the axial direction over the entire length of the deformable zone or several corrugations can be arranged axially staggered over the length of the zone.

In another arrangement, the yielding member can again be provided with a sleeve-like shape guided in frictional contact with the washer and spacing the head of the bolt from the washer by such contact until at least a minimum anchoring value is attained. When the minimum anchoring value is reached, the sleeve-like yielding member is displaced through the washer until the bolthead bears substantially on the washer.

In this expansion anchor the yielding member serves to provide the spacing action between the washer and the bolthead. As in the previous embodiment, the washer can be arranged to bear on the member to be secured to the support structure. Such a washer can also be formed as a sleeve with a bearing flange. The frictional connection between the two annular bodies, that is, the washer and the yielding member, must be selected so that there is axial displacement of the yielding part relative to the washer when the anchoring dowel has reached the minimum anchoring value. For improving the frictional connection between these two members, at least one of them can be provided in the contacting region with projections, teeth or the like.

When the frictional contact is suspended, there can still be a spacing between the bolthead and the washer which can be eliminated during further rotation of the bolt, maintaining the axial force existing between the two annular members. The bolt can be threaded into the extent that the yielding member is completely pressed through the washer and the bolthead bears on the washer. The elimination of the spacing between the bolthead and the washer, provided initially by the sleeve-like yielding member, is an optical or visual indication that the anchor has achieved its minimum anchoring value. If the bolt is further threaded in after the apacing between the bolthead and the washer has been eliminated, this axial movement has the effect that the member being secured is pressed tightly against the support structure and the resulting axial force component effects an additional spreading within the anchor. In place of a cap screw as the bolt, a threaded rod can be used with a nut screwed onto one end.

The visual control indicating the attainment of the minimum anchoring value can be more clearly provided by affording a conspicuous color scheme for the sleeve-like yielding member.

When the spreader and/or the expansion sleeve both have a frusto-conical portion permitting a self-locking action between these parts, the bolt which serves to provide the expanding force can be removed after the spreader has been pulled into the sleeve without impairing the expanded fit of the anchor in the borehole, that is, in cases where no bush mounting is possible.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
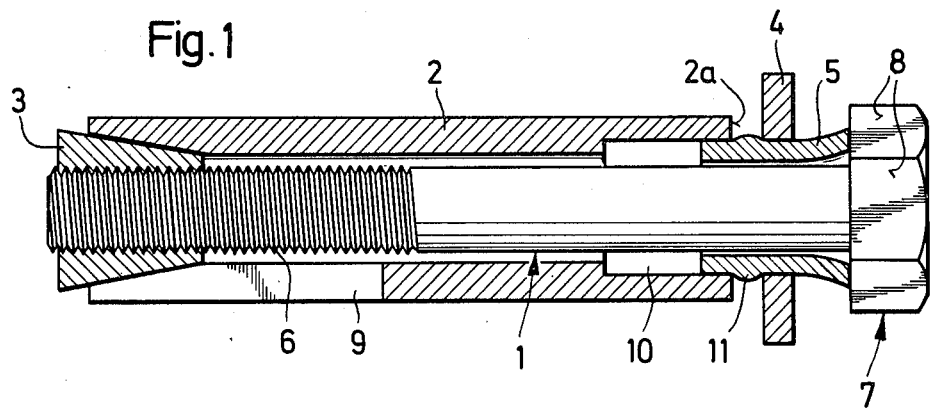
FIG. 1 is a longitudinal cross-sectional view of an expansion anchor or straddling dowel embodying the present invention and illustrated ready to be inserted into a borehole.

The expansion anchor illustrated in FIG. 1 consists of a axially elongated threaded bolt 1, an expansion sleeve 2 through which the bolt extends, a spreader 3 threaded on to the bolt and fitted into the corresponding end of the expansion sleeve, a washer 4 laterally enclosing the bolt at the opposite end from the spreader, and a sleeve-like member 5 positioned within and extending from both sides of the washer. In the description of the expansion anchor its various parts will be indicated as having a first end and a second end, the first end is that end of the anchor which is first inserted into the borehole and the second end is the opposite or trailing end of the part. The bolt 1 has a thread 6 on its first end onto which the spreader 3 is positioned. At its second end the bolt has an integral bolthead 7 provided with working surfaces 8.

Extending from the first end of the expansion sleeve 2 are one or more oblong slots 9. At its second end, in its inner surface, the expansion sleeve has an axially extending recess 10.

As can be seen in FIG. 1, the second end of the expansion sleeve is spaced axially from the bolthead 7 and the sleeve 5 on which the washer 4 is positioned extends between the second end of the expansion sleeve and the bolthead. The portion of the sleeve 5 extending from the washer to the bolthead 7 widens in a frusto-conical manner toward the bolthead. Further, a circumferential bead 11 such as a torus, is provided on the outer surface of the sleeve 5 and maintains an axial spacing between the washer 4 and the second end 2a of the expansion sleeve when the anchor is in the ready-to-set state as shown in FIG. 1.

Figure 2:
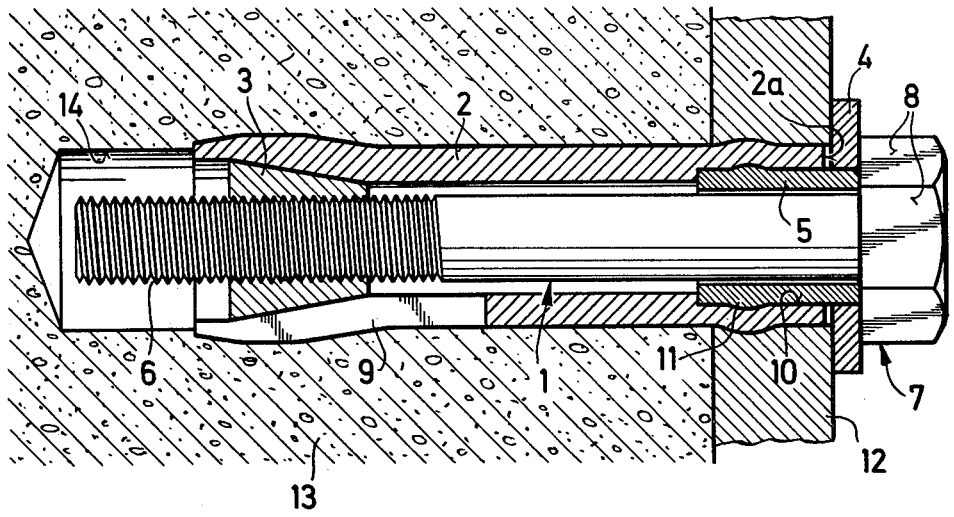
FIG. 2 is a view similar to FIG. 1, however, showing the anchor after it has been completely set within a borehole.

In FIG. 2 the expansion anchor of FIG. 1 is shown attaching a member 12 to the support structure 13. Initially, the anchor is inserted into the borehole 14 in the support structure 13 until the washer 4 bears against the member 12 to be secured to the support structure. By rotating the bolthead 7 the spreader is pulled into the first end of the expansion sleeve causing it to widen into contact with the surface within the borehole 14. During this expanding phase, the deformation of the sleeve 5 is commenced, that is, the sleeve starts to pass through the hole in the washer moving into the recess 10 in the second end of the expansion sleeve. Since the expansion sleeve is already fixed within the borehole 14, it has maintained its position in the axial direction and has not been displaced toward the bolthead 7. Further, during the expanding phase the bead 11 on the outer surface of the sleeve 5 has ensured that the second end of the expansion sleeve 2 does not contact the washer 4. As shown in FIG. 2 the sleeve 5 has been completely deformed by the bolthead 7 and pressed through the washer so that its second end is approximately flush with the face of the washer directed toward the bolthead 7. As the sleeve 5 moves into the counterbore or recess 10 the bead 11 deforms the expansion sleeve 2 elastically, and, the wall of the expansion sleeve returns to its original shape after the bead moves over it. At its fully inserted position the bead 11 affords a form-locking engagement with the inner surface of the expansion sleeve. Accordingly, when the bolthead 7 bears against the washer 4 it is an indication that the dowel has obtained its minimum anchoring value. Further torque applied to the bolthead 7 has the result that the part 12 is pressed tightly over the washer 4 against the support structure 13. This action is effected by eliminating the spacing between the second end face 2a of the expansion sleeve 2 and the washer 4, which spacing was originally provided by the bead 11. The bead 11 interlocking with the expansion sleeve 2 ensures that the member 12 can be pressed without interference against support structure 13 in the end phase of the anchoring action and does not stand up on the second end face 2a of the expansion sleeve 2. As can be seen in FIG. 2 an axial spacing remains between the second end of the expansion sleeve 2 and the face of the washer, this spacing is maintained by selecting the length of the sleeve 5 in relation to the depth of the recess 10 and the thickness of the washer 4.

Figure 3:
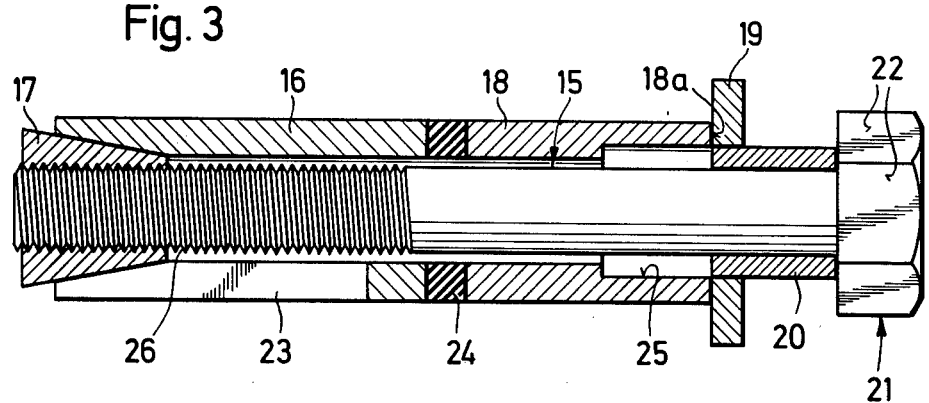
FIG. 3 is a longitudinal sectional view similar to FIG. 1 illustrating another embodiment of the present invention.

In FIG. 3 another embodiment of the expansion anchor embodying the present invention is shown and it includes an axially extending bolt 15 threaded at its first end, an expansion sleeve 16 laterally enclosing a portion of the bolt from the first end thereof, a spreader 17 mounted on the first end of the bolt and fitted into the first end of the expansion sleeve, an axially extending bush 18 laterally enclosing a part of the bolt between the second end of the expansion sleeve and the second end of the bolt, and a washer 19 laterally enclosing the first end of a sleeve 20 which extends between the second end of the bush and the second end of the bolt. The bolt 15 has a bolthead 21 at its second end and the head has working surfaces 22. Expansion sleeve 16 is provided with at least one oblong slot 23 extending from its first end toward its second end. Laterally enclosing the bolt 15 between the second end of the expansion sleeve 16 and the first end of the bush 18 is a deformation ring 24 formed of an elastic material. At its second end, the bush 18 has a recess 25 within its inner surface similar to the recess 10 within the second end of the expansion sleeve 2 as shown in FIGS. 1 and 2.

The washer 19 and the sleeve 20 are disposed in frictional contact which assures that the bolthead 22 is spaced from the second end of the bush 18. After applying torque to the bolthead 21, the spreader which is mounted on a thread 26 at the first end of the bolt, is pulled into the expansion sleeve 16 so that it widens into contact with the surface of the borehole into which the anchor is inserted. As soon as the minimum anchoring value is achieved in the expanding action, the frictional contact between the washer 19 and the sleeve 20 is overcome so that the sleeve is pressed in the axial direction through the hole in the washer 19 into the recess 25 in the second end of the bush 18. As the sleeve 20 passes through the washer the axial force developed is maintained. Accordingly, the minimum anchoring value is reached before the spacing between the bolthead and the washer is eliminated and the anchoring value is also maintained when the spacing between these two parts is eliminated. As with the previous embodiment, as the bolthead 21 bears tightly against the washer 19 it provides a visual indication that the anchor has achieved its minimum anchoring value. The torque applied after the bolthead 21 bears tightly against the washer 19, has the effect that the member to be secured to a support structure, not shown, is pressed tightly against the support structure, not shown. Since the washer 19 always bears tightly against the second end face 18a of the bush 18, the deformation ring 24 ensures that the part can be pressed against the support structure with the bush moving slightly in the axial direction toward the spreader 17 due to the compression of the deformation ring.

Figure 4:
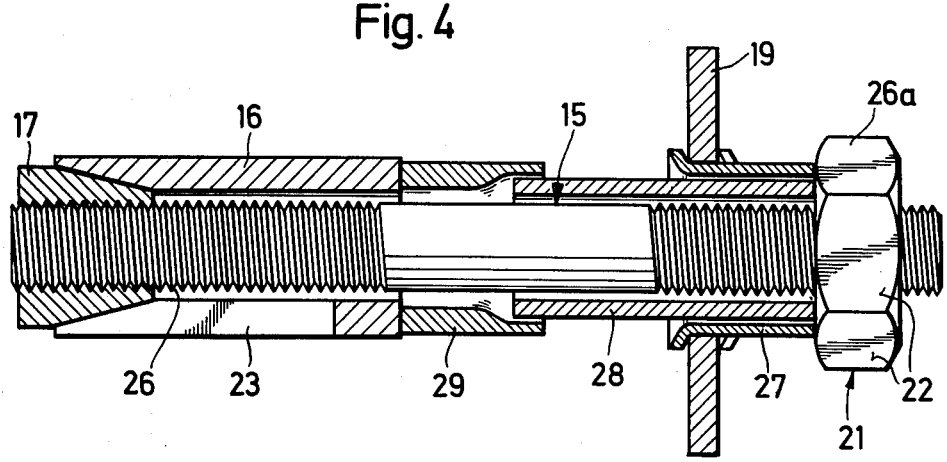
FIG. 4 is still another embodiment of an expansion anchor incorporating the present invention and shown in condition ready to be inserted into a borehole.

In the embodiment shown in FIG. 4 all parts which are identical with those shown in FIG. 3 have the same reference numerals, accordingly, reference in this respect is made to the description of FIG. 3. However, different from the embodiment in FIG. 3 is the threaded bolt 15 which, instead of an integral head 21, has a thread on its second end onto which a nut 26a is threaded. A spacer sleeve 27 laterally enclosing the second end of the bolt serves only to limit the depth of insertion over washer 19 when the anchor is set into a borehole in the support structure. Under the action of greater axial forces, however, the sleeve 27 yields permitting the washer 19 to be moved rearwardly over its outside surface. Within the sleeve 27 there is a distance sleeve 28 which bears at its second end against the nut 26a while its first end fits into and bears against the second end of a deformation part 29 which, in turn, has its first end in contact with the second end of the expansion sleeve 16. The inner surface of the deformation part 29 at its second end is recessed providing an annular space into which the first end of the distance sleeve 28 fits.

While spreader 17 is shown threaded on the bolt 15 in FIG. 4, it could be secured in a variety of ways, since in the movement of the spreader relative to the sxpansion sleeve 16 it is pulled into the sleeve and the bolt is not screwed through it. For instance, the spreader can be welded or pinned to the bolt.

In setting the anchor of FIG. 4 within a borehole, the anchor assembly is first inserted into the hole until the washer 19 limits the depth of the bolt within the hole. By applying torque to the nut 26a the frusto-conically shaped spreader 17 is pulled into the expansion sleeve 16. Upon the development of a predetermined axial force, the distance sleeve 28 and the deformation part 29 are telescoped one into the other with the deformation of the part 29 taking place reducing the distance between the second end of the expansion sleeve 16 and the nut 26a. When this distance reduction is taking place, the sleeve has already been expanded into holding contact with the surface of the borehole. As the distance is reduced, the member to be fastened is clamped by the nut 26a and the washer 19 against the support structure. During this deformation of the part 29, the spacer sleeve 27 has been completely displaced through the washer 19 so that the nut 26a contacts the washer.

While specific embodiments of the invention have been shown and described in detail to illustrate the application of the inventive principles, it will be understood that the invention may be embodied otherwise without departing from such principles.

What is claimed is:

1. An expansion anchor or straddling dowel insertable into a borehole in a support structure for securing a member to the support structure, said anchor comprising an axially elongated bolt having a first end and a second end, the first end of said bolt arranged to be inserted first into the borehole in the support structure, means on the second end of said bolt forming a laterally outwardly projecting shoulder facing toward the first end of said bolt for use in securing the member to the support structure, an expansion sleeve laterally enclosing at least a portion of the axial length of said bolt and having a first end closer to the first end of said bolt and a second end spaced between and from the first end of said expansion sleeve and said shoulder means, a spreader positioned on the first end of said bolt and arranged to expand the first end of said expansion sleeve when said bolt is displaced axially, stop means positioned on said bolt and extending laterally outwardly from said bolt and located adjacent the second end thereof for limiting the depth of insertion of said bolt into the borehole in the support structure, wherein the improvement comprises means located between the second end of said expansion sleeve and said shoulder means for yielding under the application of the forces applied for expanding said expansion sleeve by said spreader so that the axial distance between said shoulder means and the second end of said expansion sleeve is reduced and for yieldably spacing said stop means from said shoulder means before the administration of the axially applied forces which expand said expansion sleeve said means for yielding under the application of axially applied forces and for yieldably spacing said stop means from said shoulder means comprises an unitary axially elongated tubular shaped member having a first end and a second end spaced apart in the axial direction with the second end thereof in contact with said shoulder means, said stop means comprising an annular washer laterally enclosing said tubular shaped member at a position spaced from the first and second ends thereof, at least a portion of said tubular shaped member between the location thereon of said washer and the second end of said tubular shaped member having an outside diameter which is greater than the smallest inside diameter of said washer and said tubular shaped member being deformable so that the outside surface thereof can be displaced through the opening through said washer.

2. An expansion anchor or straddling dowel, as set forth in claim 1, wherein the portion of said tubular shaped member between the second end thereof and said washer widens toward the second end.

3. An expansion anchor or straddling dowel, as set forth in claim 2, wherein the portion of said tubular shaped member between the second end thereof and said washer is frustoconically shaped and widens progressively from said washer to the second end thereof.

4. An expansion anchor or straddling dowel, as set forth in claim 3, wherein the larger end of said frustoconically shaped portion of said tubular shaped member is in contact with said shoulder means on said bolt.

5. An expansion anchor or straddling dowel, as set forth in claim 3, wherein said frusto-conically shaped portion of said tubular shaped member has at least one axially extending corrugation thereon.

6. An expansion anchor or straddling dowel, as set forth in claim 1, wherein the radially outer surface of said tubular shaped member has an annular outwardly projecting bead spacing said washer from the second end of said expansion sleeve.

7. An expansion anchor or straddling dowel, as set forth in claim 1, wherein said shoulder means comprises a multisided bolthead integrally attached to the second end of said bolt.

* * * * *